US012386609B2

(12) United States Patent
Griffin et al.

(10) Patent No.: US 12,386,609 B2
(45) Date of Patent: Aug. 12, 2025

(54) SUPERDENSE CODING OF SOFTWARE PACKAGE DELTAS

(71) Applicant: Red Hat, Inc., Raleigh, NC (US)

(72) Inventors: Leigh Griffin, Waterford (IE); Stephen Coady, Dublin (IE)

(73) Assignee: Red Hat, Inc., Raleigh, NC (US)

(*) Notice: Subject to any disclaimer, the term of this patent is extended or adjusted under 35 U.S.C. 154(b) by 164 days.

(21) Appl. No.: 18/161,410

(22) Filed: Jan. 30, 2023

(65) Prior Publication Data
US 2024/0256270 A1 Aug. 1, 2024

(51) Int. Cl.
*G06F 8/658* (2018.01)
*H04B 10/70* (2013.01)

(52) U.S. Cl.
CPC ............ *G06F 8/658* (2018.02); *H04B 10/70* (2013.01)

(58) Field of Classification Search
USPC .................................................. 717/168–173
See application file for complete search history.

(56) References Cited

U.S. PATENT DOCUMENTS

| | | | |
|---|---|---|---|
| 8,370,829 B2 | 2/2013 | Ferris et al. | |
| 10,756,826 B1 | 8/2020 | Coady et al. | |
| 11,133,823 B2 | 9/2021 | Griffin et al. | |
| 11,360,924 B1 | 6/2022 | Griffin et al. | |
| 2003/0220944 A1* | 11/2003 | Lyman Schottland | G06F 8/658 707/999.203 |
| 2005/0289533 A1* | 12/2005 | Wang | G06F 11/1417 707/999.203 |
| 2006/0112113 A1* | 5/2006 | Gu | G06T 7/97 |
| 2007/0234343 A1* | 10/2007 | Gouge | G06F 21/51 717/174 |
| 2020/0201655 A1* | 6/2020 | Griffin | G06F 9/4494 |
| 2020/0366316 A1* | 11/2020 | Griffin | H03M 7/30 |
| 2021/0273792 A1* | 9/2021 | Coady | H04L 9/0819 |
| 2021/0398008 A1* | 12/2021 | Griffin | G06N 10/80 |
| 2022/0051121 A1* | 2/2022 | Griffin | G06N 10/20 |
| 2022/0237146 A1* | 7/2022 | Griffin | G06F 16/18 |
| 2022/0269976 A1* | 8/2022 | Wang | G06N 10/00 |
| 2022/0308966 A1 | 9/2022 | Coady et al. | |
| 2023/0370254 A1* | 11/2023 | McCarty | H04B 10/70 |

OTHER PUBLICATIONS

Kowalewski, Marcus, et al., "Sustainable Packaging of Quantum Chemistry Software with the Nix Package Manager," Int. J. Quantum Chem., 122, e26872, http://arxiv.org/abs/2110.05163v2, Dec. 16, 2021, 15 pages.

(Continued)

*Primary Examiner* — Qing Chen
(74) *Attorney, Agent, or Firm* — Dority & Manning, P.A.

(57) ABSTRACT

A package delta that identifies differences between a first software package and a second software package is accessed. It is determined that the package delta is to be securely communicated to a second quantum computing system upon the occurrence of a first condition. It is determined that the first condition has occurred. In response to determining that the first condition has occurred, the package delta is transferred to the second quantum computing system using superdense coding.

17 Claims, 4 Drawing Sheets

(56) References Cited

OTHER PUBLICATIONS

Weder, Benjamin, et al., "Hybrid Quantum Applications Need Two Orchestrations in Superposition: A Software Architecture Perspective," 2021 IEEE International Conference on Web Services (ICWS), doi: 10.1109/ICWS53863.2021.00015, 2021, 14 pages.

Zhukov, A.A., et al., "Quantum communication protocols as a benchmark for programmable quantum computers," Quantum Information Processing (2019) 18:31, https://doi.org/10.1007/s11128-018-2144-y, Dec. 6, 2018, 23 pages.

* cited by examiner

SUPERDENSE CODING OF SOFTWARE PACKAGE DELTAS

BACKGROUND

Software vendors release new software package versions from time to time to add new features, fix software bugs, and for other reasons. Often, if a licensee already has a version of a software package, the licensee need only obtain the differences between the existing software package and the updated version of the software package, sometimes referred to as a software package delta, and update the existing software package with the software package delta to upgrade to the new software package version.

SUMMARY

The examples disclosed herein implement superdense coding of software package deltas.

In one example a method is provided. The method includes accessing, by a first quantum computing system, a package delta that identifies differences between a first software package and a second software package. The method further includes determining, by the first quantum computing system, that the package delta is to be securely communicated to a second quantum computing system upon the occurrence of a first condition. The method further includes determining, by the first quantum computing system, that the first condition has occurred. The method further includes in response to determining, by the first quantum computing system, that the first condition has occurred, transferring the package delta to the second quantum computing system using superdense coding.

In another example a quantum computing system is provided. The quantum computing system includes a memory, and a processor device coupled to the memory. The processor device is to access a package delta that identifies differences between a first software package and a second software package. The processor device is further to determine that the package delta is to be securely communicated to a second quantum computing system upon the occurrence of a first condition. The processor device is further to determine that the first condition has occurred. The processor device is further to, in response to determining that the first condition has occurred, transfer the package delta to the second quantum computing system using superdense coding.

In another example a non-transitory computer-readable storage medium is provided. The non-transitory computer-readable storage medium includes executable instructions to cause a processor device to access a package delta that identifies differences between a first software package and a second software package. The executable instructions further cause the processor device to determine that the package delta is to be securely communicated to a second quantum computing system upon the occurrence of a first condition. The executable instructions further cause the processor device to determine that the first condition has occurred, and, in response to determining that the first condition has occurred, transfer the package delta to the second quantum computing system using superdense coding.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
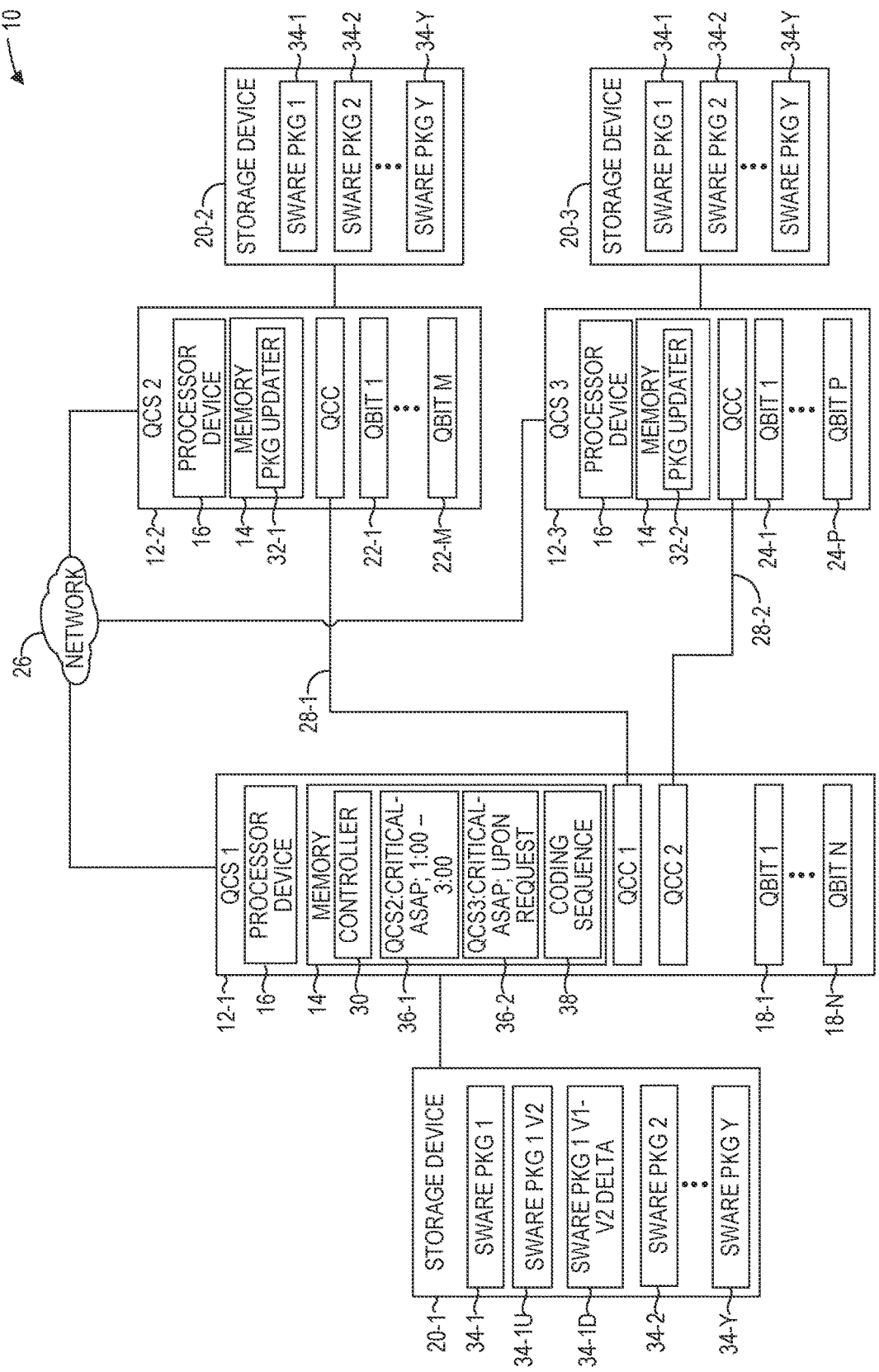
FIG. 1 is a block diagram of an environment in which superdense coding of software package deltas can be practiced according to one implementation.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

Software vendors release new software package versions from time to time to add new features, fix software bugs, and for other reasons. Often, if a licensee already has a version of a software package, the licensee need only obtain the differences between the existing software package and the updated version of the software package, sometimes referred to as a software package delta, and update the existing software package with the software package delta to upgrade to the new software package version.

In a quantum computing environment, it may be desirable to communicate software package deltas securely and in a manner that utilizes a quantum communication channel as efficiently as possible. This may be especially true in an environment where the software is used for applications involving security, finance, government, defense or other highly sensitive areas where disclosure of the software may be extremely problematic.

The examples disclosed herein implement superdense coding of software package deltas. The examples access a package delta that identifies differences between a first software package and a second software package. It is determined that the package delta is to be communicated securely to a quantum computing system upon the occurrence of a condition. Once the condition has occurred, the package delta is communicated over a quantum communication channel using superdense coding. The examples, among other advantages, utilize superdense coding to minimize the amount of qubits necessary to communicate the package delta from one quantum computing system to another quantum computing system. Moreover, if the qubits are intercepted or otherwise accessed, the information (i.e., a pair of binary values) encoded in each qubit cannot be determined, and thus a nefarious entity cannot reverse engineer the package delta.

FIG. 1 is a block diagram of an environment 10 in which superdense coding of software package deltas can be practiced according to one implementation. The environment 10 includes a group of quantum computing systems (QCSs) 12-1-12-3 (generally, QCSs 12). The QCSs 12 each include a system memory 14 and a processor device 16. The QCS 12-1 implements a plurality of qubits 18-1-18-N, and is communicatively coupled to a storage device 20-1. The QCS 12-2 implements a plurality of qubits 22-1-22-M, and is communicatively coupled to a storage device 20-2. The QCS 12-3 implements a plurality of qubits 24-1-24-P, and is communicatively coupled to a storage device 20-3.

The QCSs 12 may be communicatively coupled to one another via a high-speed conventional data network 26 to facilitate communications using traditional non-quantum data. The QCS 12-1 may be communicatively coupled to the QCS 12-2 via a quantum communications channel 28-1 to facilitate the transfer of quantum information, such as qubits, between the QCS 12-1 and 12-2. The QCS 12-1 may also be communicatively coupled to the QCS 12-3 via a quantum communications channel 28-2 to facilitate the transfer of quantum information between the QCS 12-1 and 12-3. It is to be understood that the environment 10, in practice, may include more QCSs 12 than those illustrated in FIG. 1. Additionally, the QCSs 12 in some examples may include constituent elements in addition to those illustrated in FIG. 1.

The QCSs 12 operate in quantum environments, but are each capable of operating using classical computing principles or quantum computing principles. When using quantum computing principles, the QCSs 12 perform computations that utilize quantum-mechanical phenomena, such as superposition and/or entanglement states. The QCSs 12 may operate under certain environmental conditions, such as at or near zero degrees (0°) Kelvin. When using classical computing principles, the QCSs 12 utilize binary digits that have a value of either zero (0) or one (1).

The QCS 12-1 executes a controller 30 that operates as a software package distributor to the QCSs 12-2 and 12-3. The controller 30 communicates with a package updater 32-1 executing on the QCS 12-2 when distributing software to the QCS 12-2 and with a package updater 32-2 executing on the QCS 12-3 when distributing software to the QCS 12-3. In this example, each of the QCSs 12-1-12-3 have multiple software packages 34-1-34-Y stored on the corresponding storage devices 20.

The QCS 12-1 receives a software package 34-1U which is a new version of the software package 34-1. The QCS 12-1 analyzes the software package 34-1 and the software package 34-1U to determine the differences between the software package 34-1 and the software package 34-1U. The software packages 34-1 and 34-1U may comprise a number of files, including, by way of non-limiting example, data files, executable files, source code files, or the like. The differences between the software packages 34-1 and 34-1U may be, for example, one or more of the addition of a new file, the deletion of a file, a difference in executable code, a difference in source code, or the like. The QCS 12-1, based on the analysis, generates a package delta 34-1D that identifies the differences between the software packages 34-1 and 34-1U and that can be used by the package updaters 32-1, 32-2 to update the software packages 34-1 stored on the storage devices 20-2 and 20-3 to the software package 34-1U. In some implementations, the QCS 12-1 may generate the package delta 34-1D using, for example, a Linux makedeltarpm linux command. In some implementations, rather than generating the package delta 34-1D, the QCS 12-1 may be provided with the package delta 34-1D from an internal or external source.

The QCS 12-1 may include conditions identified for each of the QCSs 12-2 and 12-3 that indicate the conditions under which a package delta 34-1D should be provided to the respective QCS 12-2, 12-3. A conditions entry 36-1 corresponds to the QCS 12-2 and indicates that if a package delta has a particular priority, such as having been identified as a critical update as might occur for a package delta that fixes a security problem, the QCS 12-1 should communicate the package delta to the QCS 12-2 as soon as possible. Otherwise the QCS 12-1 should communicate the package delta to the QCS 12-2 between the hours of 1:00 am and 3:00 am, when overall usage of the QCS 12-2 is expected to be low.

A conditions entry 36-2 corresponds to the QCS 12-3 and indicates that if a package delta has a particular priority, such as having been identified as a critical update, the QCS 12-1 should communicate the package delta to the QCS 12-3 as soon as possible. Otherwise the QCS 12-1 should communicate the package delta to the QCS 12-3 when the QCS 12-3 requests the package delta.

In this example, the package delta 34-1D is not a critical update but is indicated to be a sensitive package delta. In some implementations, the controller 30 may communicate non-sensitive package deltas to the QCSs 12-2, 12-3 via the network 26.

The controller 30 subsequently determines that the time is 1:00 am and thus that the condition identified in the conditions entry 36-1 has occurred. The controller 30 determines a quantity of binary bits of the package delta 34-1D. As an example, assume for purposes of illustration that the package delta 34-1D comprises 128 bits. The controller 30 then allocates a set of control qubits 18 from the qubits 18-1-18-N suitable for communicating the bits using superdense coding. Because the controller 30 will code each qubit with the values of two classical bits, the controller 30 allocates a quantity of qubits 18 equal to ½ of the number of binary bits. Thus, in this example, the set of control qubits comprises 64 qubits 18.

The controller 30 then entangles each control qubit in the first set of qubits with a corresponding target qubit in a second set of qubits, thus forming 64 entangled pairs of qubits, wherein one qubit in the entangled pair is a control qubit and the other is a target qubit. In one implementation, the second set of qubits may comprise another 64 qubits 18 allocated from the qubits 18-1-1-N. In another implementation, the controller 30 may communicate with the package updater 32-1 on the QCS 12-2 and request access to 64 qubits 22-1-22-M, and thus, in this implementation, the second set of qubits are on the QCS 12-2.

To entangle each source qubit 18 with a target qubit, the controller 30 may apply a Hadamard gate to the pair of qubits to create superposition. The controller 30 may then apply a CNOT gate using the qubit in the first set of qubits as the control qubit and the second as the target qubit to entangle the qubits. If the second set of qubits were allocated from the qubits 18-1-18-N, the QCS 12-1 sends the second set of qubits to the QCS 12-2 via the communication channel 28-1. The controller 30 may then superdense code the control qubits 18 with the binary values of the package delta 34-1D. As an example, the controller 30 may apply the following gates to each control qubit 18 to code the desired binary values: Identity gate (i.e., do nothing)=00, X gate=01, Z gate=10, and ZX gate=11. The controller 30 generates a coding sequence 38 that identifies each control qubit 18 and the order of the qubit 18 in the sequence.

The QCS 12-1 then communicates the control qubits 18 in the first set of qubits 18 to the QCS 12-2. The QCS 12-1 also communicates the coding sequence 38 to the QCS 12-2. The package updater 32-1 then decodes the qubits. In one example, for each pair of qubits, the QCS 12-2 applies a CNOT gate. The QCS 12-2 then applies a Hadamard gate to the source qubit of the pair, and performs a measurement on both qubits to extract the pair of transmitted qubits. In this manner, the QCS 12-1 communicates the package delta 34-1D to the QCS 12-2 in a fast and secure manner that is immune from being observed by an eavesdropper or other nefarious entity.

In the example wherein the second set of target qubits are implemented by the QCS 12-2, the QCS 12-1 need not communicate the second set of qubits to the QCS 12-2.

In some examples, the QCS 12-1 may immediately entangle the first set of qubits 18 with the target qubits at the QCS 12-2 prior to the occurrence of the condition identified in the conditions entry 36-1. Upon occurrence of the condition, the QCS 12-1 need only superdense code the qubits in the first set of qubits and send the first set of qubits to the QCS 12-2.

The controller 30 repeats the process with the QCS 12-3 upon the occurrence of a condition identified in the conditions entry 36-2.

It is noted that, because the controller 30 is a component of the QCS 12-1, functionality implemented by the controller 30 may be attributed to the QCS 12-1 generally. Moreover, in examples where the controller 30 comprises software instructions that program the processor device 16 to carry out functionality discussed herein, functionality implemented by the controller 30 may be attributed herein to the processor device 16.

Figure 2:
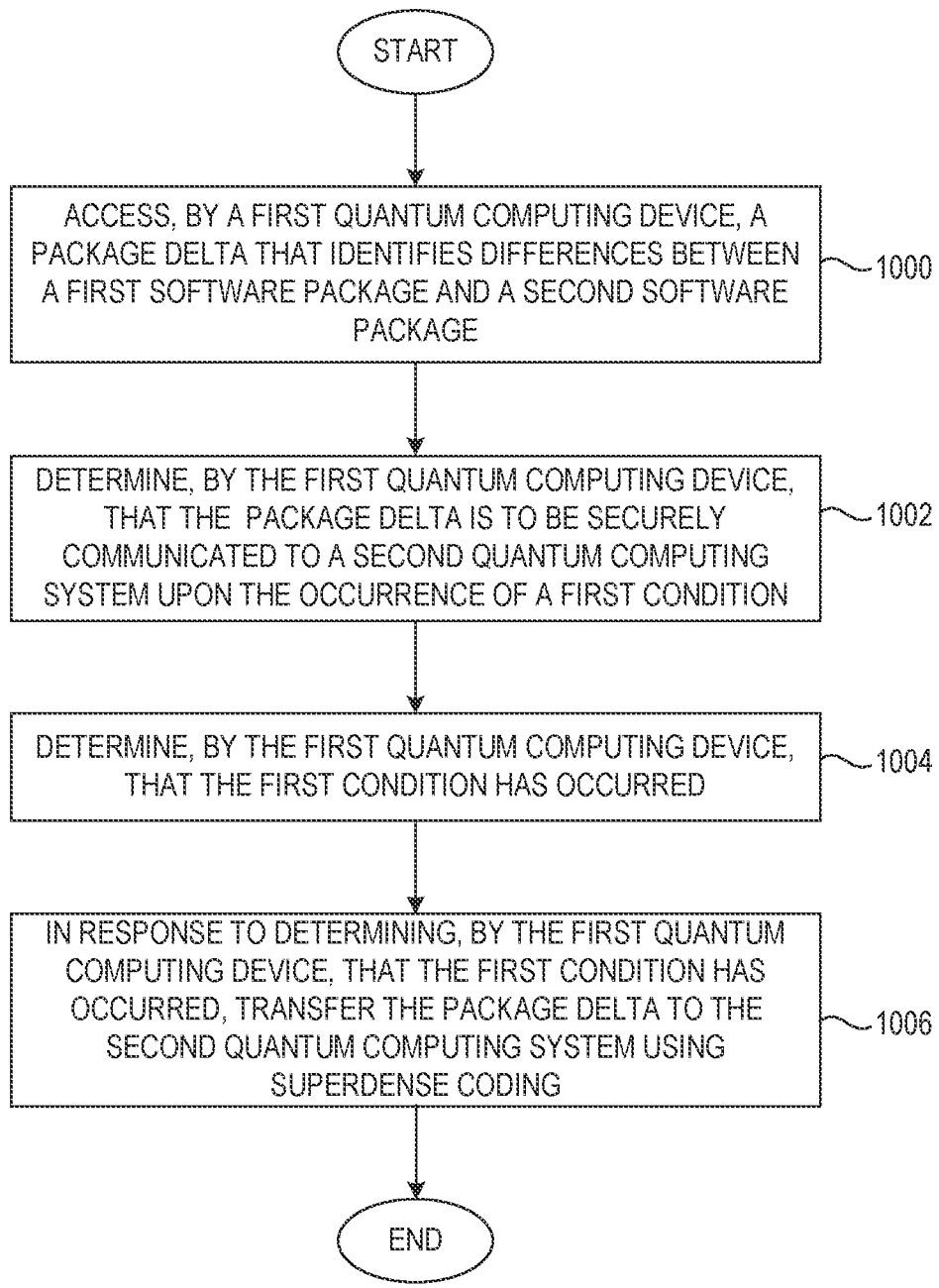
FIG. 2 is a method for superdense coding of software package deltas according to one implementation.

FIG. 2 is a method for superdense coding of software package deltas according to one implementation. FIG. 2 will be discussed in conjunction with FIG. 1. The QCS 12-1 accesses the package delta 34-1D that identifies differences between the software package 34-1 and the software package 34-1U (FIG. 2, block 1000). The QCS 12-1 determines that the package delta 34-1D is to be securely communicated to the QCS 12-2 upon the occurrence of a condition (FIG. 2, block 1002). The QCS 12-1 determines that the condition has occurred (FIG. 2, block 1004). The QCS 12-1, in response to determining that the condition has occurred, transfers the package delta 34-1D to the QCS 12-2 using superdense coding (FIG. 2, block 1006).

Figure 3:
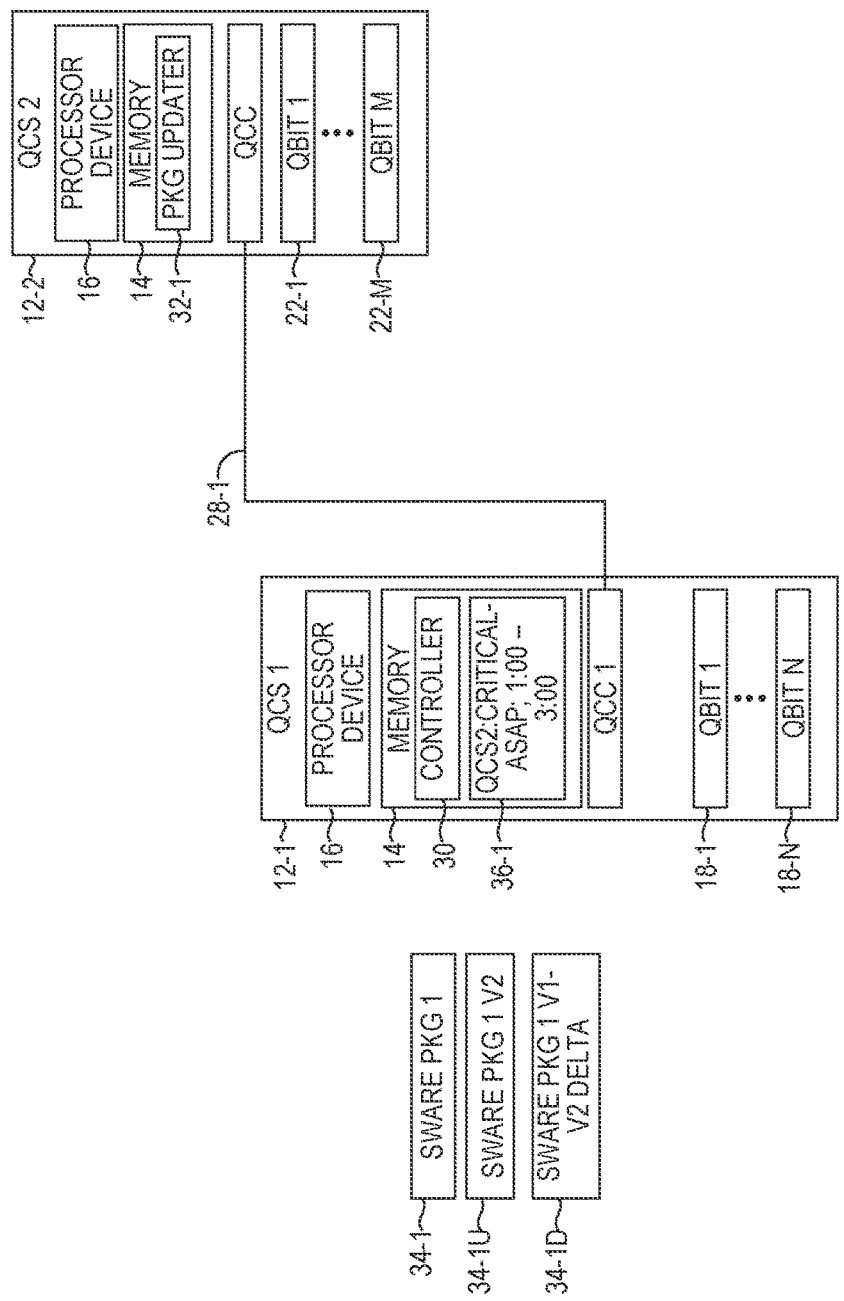
FIG. 3 illustrates an environment which is a simplified block diagram of the environment illustrated in FIG. 1 according to one implementation.

FIG. 3 illustrates an environment 10-1 which is a simplified block diagram of the environment 10 illustrated in FIG. 1 according to one implementation. The environment 10-1 includes the QCS 12-1, the memory 14 and the processor device 16. The processor device 16 is to access the package delta 34-1D that identifies differences between the software package 34-1 and the software package 34-1U. The processor device 16 is to determine that the package delta 34-1D is to be securely communicated to the QCS 12-2 upon the occurrence of a condition. The processor device 16 is to determine that the condition has occurred. The processor device 16 is to, in response to determining that the condition has occurred, transfer the package delta 34-1D to the QCS 12-2 using superdense coding.

Figure 4:
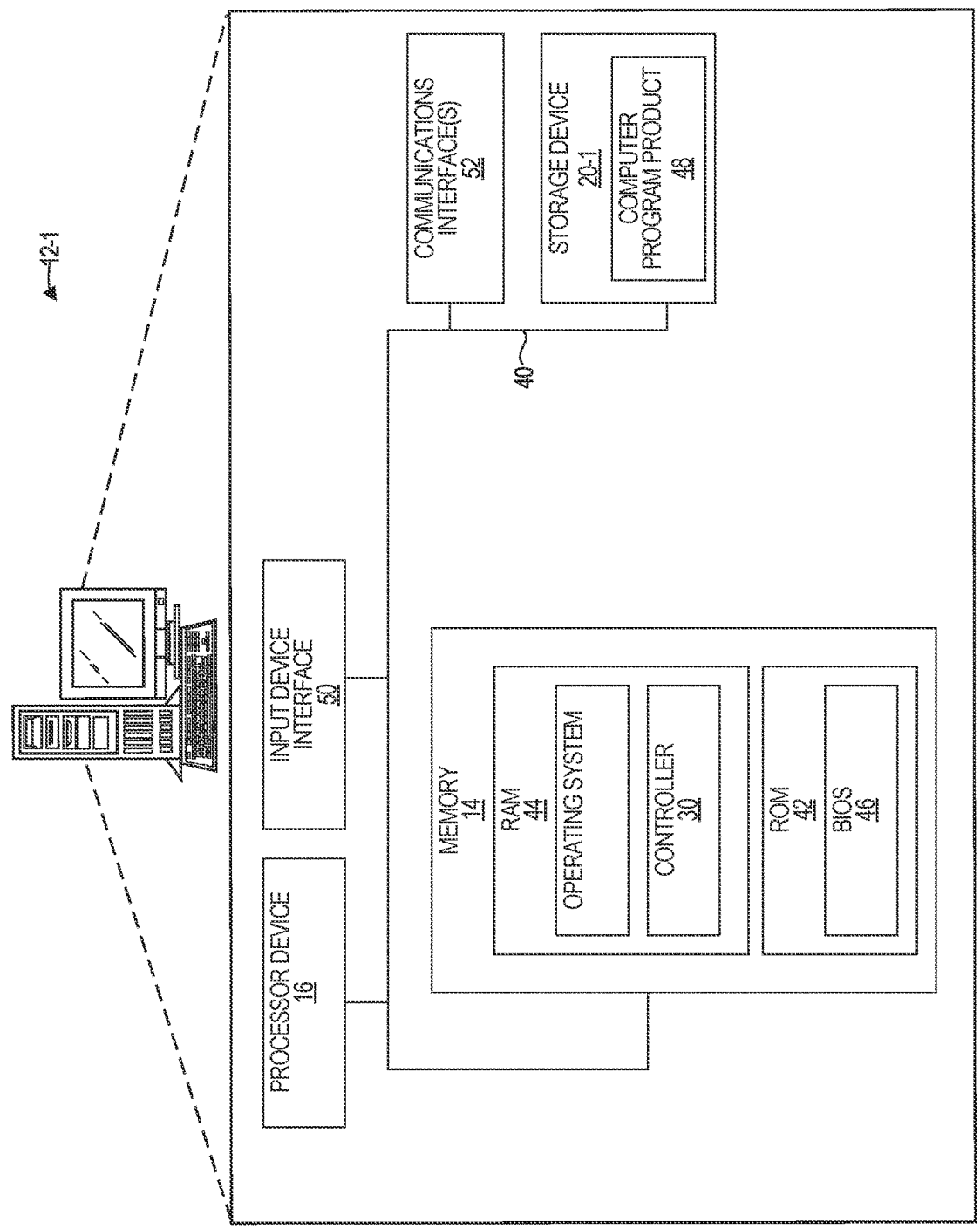
FIG. 4 is a block diagram of a quantum computing system suitable for implementing examples according to one example.

FIG. 4 is a block diagram of the QCS 12-1 suitable for implementing examples according to one example. The QCS 12-1 may comprise any computing or electronic device capable of including firmware, hardware, and/or executing software instructions to implement the functionality described herein, such as a quantum computer system, or the like. The QCS 12-1 includes the processor device 16, the system memory 14, and a system bus 40. The system bus 40 provides an interface for system components including, but not limited to, the system memory 14 and the processor device 16. The processor device 16 can be any commercially available or proprietary processor.

The system bus 40 may be any of several types of bus structures that may further interconnect to a memory bus (with or without a memory controller), a peripheral bus, and/or a local bus using any of a variety of commercially available bus architectures. The system memory 14 may include non-volatile memory 42 (e.g., read-only memory (ROM), erasable programmable read-only memory (EPROM), electrically erasable programmable read-only memory (EEPROM), etc.), and volatile memory 44 (e.g., random-access memory (RAM)). A basic input/output system (BIOS) 46 may be stored in the non-volatile memory 42 and can include the basic routines that help to transfer information between elements within the QCS 12-1. The volatile memory 44 may also include a high-speed RAM, such as static RAM, for caching data.

The QCS 12-1 may further include or be coupled to a non-transitory computer-readable storage medium such as the storage device 20-1, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 20-1 and other drives associated with computer-readable media and computer-usable media may provide non-volatile storage of data, data structures, computer-executable instructions, and the like.

A number of modules can be stored in the storage device 20-1 and in the volatile memory 44, including an operating system and one or more program modules, such as the controller 30, which may implement the functionality described herein in whole or in part. All or a portion of the examples may be implemented as a computer program product 48 stored on a transitory or non-transitory computer-usable or computer-readable storage medium, such as the storage device 20-1, which includes complex programming instructions, such as complex computer-readable program code, to cause the processor device 16 to carry out the steps described herein. Thus, the computer-readable program code can comprise software instructions for implementing the functionality of the examples described herein when executed on the processor device 16. The processor device 16, in conjunction with the controller 30 in the volatile memory 44, may serve as a controller, or control system, for the QCS 12-1 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 16 through an input device interface 50 that is coupled to the system bus 40 but can be connected by other interfaces such as a parallel port, an Institute of Electrical and Electronic Engineers (IEEE) 1394 serial port, a Universal Serial Bus (USB) port, an IR interface, and the like. The QCS 12-1 may also include a plurality of communications interfaces 52 suitable for communicating with the 26 and establishing the quantum communications channel 28-1.

Individuals will recognize improvements and modifications to the preferred examples of the disclosure. All such improvements and modifications are considered within the scope of the concepts disclosed herein and the claims that follow.

What is claimed is:

1. A method comprising:
   accessing, by a first quantum computing system (QCS), a package delta that identifies differences between a first software package and a second software package;
   determining, by the first QCS, that the package delta is to be securely communicated to a second QCS upon an occurrence of a first condition;
   determining, by the first QCS, that the first condition has occurred; and
   in response to determining, by the first QCS, that the first condition has occurred, transferring, by the first QCS, the package delta to the second QCS using superdense coding, wherein transferring, by the first QCS, the package delta to the second QCS using superdense coding comprises:
      determining a quantity of binary bits of the package delta, wherein the quantity of binary bits of the package delta comprises a pair of binary bits of the package delta;
      determining a first set of qubits, wherein the first set of qubits is suitable for communicating values of the pair of binary bits of the package delta using superdense coding;
      entangling each qubit in the first set of qubits with a corresponding qubit in a second set of qubits;
      superdense coding each qubit in the first set of qubits with the pair of binary bits of the package delta; and
      sending the first set of qubits to the second QCS.

2. The method of claim 1 wherein the first condition comprises a usage of a quantum channel between the first QCS and the second QCS is below a channel usage threshold.

3. The method of claim 1 wherein the first condition is a priority of the package delta.

4. The method of claim 1 wherein the first condition comprises a receipt of a request for the package delta from the second QCS.

5. The method of claim 1 further comprising:
   receiving, by the first QCS, a first version of a software package;
   subsequently receiving, by the first QCS, a second version of the software package; and
   analyzing the first version of the software package and the second version of the software package to generate the package delta.

6. The method of claim 1 further comprising:
   determining, by the first QCS, that the package delta is to be securely communicated to a third QCS upon an occurrence of a second condition;
   determining, by the first QCS, that the second condition has occurred; and
   in response to determining, by the first QCS, that the second condition has occurred, transferring, by the first QCS, the package delta to the third QCS using superdense coding.

7. The method of claim 1 wherein the second set of qubits is at the first QCS, and further comprising:
   subsequent to entangling each qubit in the first set of qubits with the corresponding qubit in the second set of qubits, sending, by the first QCS to the second QCS, the second set of qubits.

8. The method of claim 1 wherein the second set of qubits is at the second QCS prior to being entangled with the first set of qubits.

9. The method of claim 1 wherein each qubit in the first set of qubits is entangled with the corresponding qubit in the second set of qubits prior to the occurrence of the first condition.

10. The method of claim 1 further comprising:
    maintaining a sequence of the first set of qubits; and
    sending, by the first QCS to the second QCS, the sequence of the first set of qubits.

11. A first quantum computing system (QCS) comprising:
    a memory; and
    a processor device coupled to the memory to:
       access a package delta that identifies differences between a first software package and a second software package;
       determine that the package delta is to be securely communicated to a second QCS upon an occurrence of a first condition;
       determine that the first condition has occurred; and
       in response to determining that the first condition has occurred, transfer the package delta to the second QCS using superdense coding, wherein transferring the package delta to the second QCS using superdense coding comprises:
          determining a quantity of binary bits of the package delta, wherein the quantity of binary bits of the package delta comprises a pair of binary bits of the package delta;
          determining a first set of qubits, wherein the first set of qubits is suitable for communicating values of the pair of binary bits of the package delta using superdense coding;
          entangling each qubit in the first set of qubits with a corresponding qubit in a second set of qubits;
          superdense coding each qubit in the first set of qubits with the pair of binary bits of the package delta; and
          sending the first set of qubits to the second QCS.

12. The first quantum computing system (QCS) of claim 11 wherein the second set of qubits is at the first QCS, and wherein the processor device is further to:
    subsequent to entangling each qubit in the first set of qubits with the corresponding qubit in the second set of qubits, send, to the second QCS, the second set of qubits.

13. The first quantum computing system (QCS) of claim 11 wherein the second set of qubits is at the second QCS prior to being entangled with the first set of qubits.

14. The first quantum computing system (QCS) of claim 11 wherein each qubit in the first set of qubits is entangled with the corresponding qubit in the second set of qubits prior to the occurrence of the first condition.

15. A non-transitory computer-readable storage medium that stores executable instructions to cause a processor device of a first quantum computing system (QCS) to:
- access a package delta that identifies differences between a first software package and a second software package;
- determine that the package delta is to be securely communicated to a second QCS upon an occurrence of a first condition;
- determine that the first condition has occurred; and
- in response to determining that the first condition has occurred, transfer the package delta to the second QCS using superdense coding, wherein transferring the package delta to the second QCS using superdense coding comprises:
  - determining a quantity of binary bits of the package delta, wherein the quantity of binary bits of the package delta comprises a pair of binary bits of the package delta;
  - determining a first set of qubits, wherein the first set of qubits is suitable for communicating values of the pair of binary bits of the package delta using superdense coding;
  - entangling each qubit in the first set of qubits with a corresponding qubit in a second set of qubits;
  - superdense coding each qubit in the first set of qubits with the pair of binary bits of the package delta; and
  - sending the first set of qubits to the second QCS.

16. The non-transitory computer-readable storage medium of claim 15 wherein the second set of qubits is at the first QCS, and wherein the executable instructions further cause the processor device of the first QCS to:
- subsequent to entangling each qubit in the first set of qubits with the corresponding qubit in the second set of qubits, send, to the second QCS, the second set of qubits.

17. The non-transitory computer-readable storage medium of claim 15 wherein the second set of qubits is at the second QCS prior to being entangled with the first set of qubits.

* * * * *